United States Patent Office 3,555,136
Patented Jan. 12, 1971

3,555,136
PROCESS FOR THE PRODUCTION OF A POROUS SHEET
Paul Rouault, Rue d'Estienne d'Orves, France, assignor to Rhone-Poulenc S.A., Paris, France, a French body corporate
Filed June 27, 1967, Ser. No. 649,111
Claims priority, application France, July 1, 1966, 67,944
Int. Cl. B29d 27/08
U.S. Cl. 264—122                     6 Claims

ABSTRACT OF THE DISCLOSURE

Porous sheets are made by depositing on a support a layer of a mixture of fusible powder and shrinkable thermoplastic fibrils and heating the layer from the side in contact with the support.

---

Figure 1:
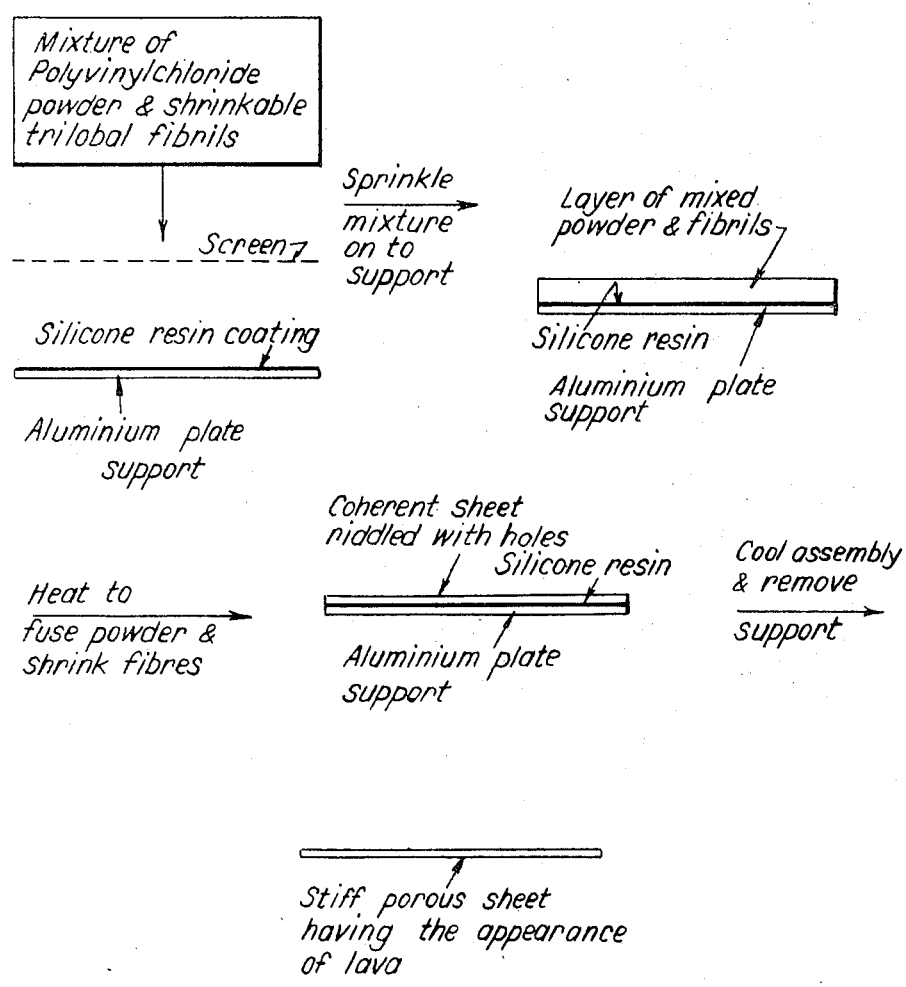

The present invention relates to the production of porous sheets.

It is known to obtain sheets of thermoplastic material by the application of a fusible powder to a heated support. The sheets thus produced can remain fixed to the support (in which case they are usually referred to as coatings) or they can be detached from the support for transfer to another support or for use by themselves. These sheets are not necessarily flat, and may be corrugated, embossed, or even in the form of thin-walled objects or parts of objects.

The reverse of a sheet obtained by the fusion of a powder is generally a faithful negative of the surface of the support on which it was formed. The other face on the other hand reproduces the same surface with a more or less marked thickening. It is generally smooth and uniform, unless a heating defect causes incompletely fused powder grains to appear. Furthermore, unless they are particularly thin, these sheets are impervious.

The present invention provides a novel sheet (in the wide sense used above) of synthetic plastic material, which is porous and has an irregular surface of decorative appearance.

The porous sheets of the invention are obtained by depositing on a support a layer of a mixture of fusible powder and shrinkable thermoplastic fibrils, and heating the layer from the side in contact with the support until the powder in contact with the support is completely fused and the remainder of the powder has softened. The dimensions of the powder particles and of the fibrils are not critical and depend essentially on the desired effect and the possibilities of use; they can easily be determined in a routine manner by the person skilled in the art. The powder is preferably capable of passing through a screen having 3 mm. meshes, and more particularly through a screen having 0.5 mm. meshes, but is retained by a screen having meshes of 80µ. The granulometric distribution is not very important, but the product produced is more porous as the particles are more uniform. The dimensions of the fibrils are also not critical, but it is generally found that there are no advantages in going beyond the limits 0.5 to 20 mm. as regards length and 5 to 2,000 denier for the count. The shape of their cross-section is not important. It is essential that the fibrils can undergo a shrinkage of at least 10% by heating (a simultaneous crimping effect is not an inconvenience) or even fuse, collecting into fine droplets. It is generally advantageous for the fibrils to shrink only at a temperature at which the surface of the powder granules is already sticky, and the fusion temperature of the fibrils should be lower than the degradation threshold of the granules or their usual ingredients.

The nature of the materials used is determined by the use to which the sheet is to be put. The fusible powder can be, e.g., a thermoplastic material such as polyvinyl chloride or acetate (or other vinyl esters), a polyolefin (polyethylene, polypropylene, or polystyrene) a polyacrylic ester, a polyamide, a linear polyester or a thermoplastic copolymer. These products can be accompanied by the usual adjuvants, more particularly plasticisers, which may be dissolved in the polymer or coated on the individual particles. The powder may also be a thermosetting prepolymer, provided that its particles are already sticky when the fibrils shrink.

The fibres may be a spinnable thermoplastic copolymer or polymer, or be compound fibres formed by the juxtaposition of two or more polymers spun through the holes of conventional spinnerets. The polymers may be chosen from the group indicated above for the thermoplastic powder. In most cases, powders and fibres are associated whose adhesion to one another is maintained after solidification, but this is not essential.

Naturally, the usual ingredients may be present in the polymers, e.g. plasticisers, disperse dyestuffs or pigments, inert or reinforcing fillers consisting of powder or fibres, and stabilisers. The relative proportions of the various constituents may vary within wide limits in dependence on the desired effect.

The way in which the mixture is applied to the support depends on the materials present, and more particularly on their tendency to separate. The risk of separation is higher in proportion as differences in density are more marked, and as the fibrils have a greater tendency to tangle with one another (a tendency which increases with their length). Depending on its precise composition, either the mixture will be poured directly on to the support, through a screen for example, or powder and fibres will be poured separately, either simultaneously, or in alternate layers, with or without agitation of the support. When the mixture contains a plasticiser in the liquid state, the whole mixture can also be made into a paste and applied by a brush, with an extruder or by any other known means.

The mixture is heated at least partly by the support, until the powder in contact with the support has fused completely, but the remainder of the powder has simply softened. The thickness of the fused layer is determined by the porosity or strength desired, which vary in inverse proportion to one another. The sheet can then be heated by its visible face, e.g. by infra-red radiation, by hot gas, or by a combination of these means.

The heat causes the fibres to shrink, entraining in their movement sticky particles of powder and consequently producing pores and crevices in the pasty mass. Depending on the shrinking power, the viscosity and the surface tension of the polymer constituting the fibrils, these may remain visible or may be submerged in the general appearance of the sheet, simply leaving coloured stains as evidence of their presence, if desired.

Figure 2:
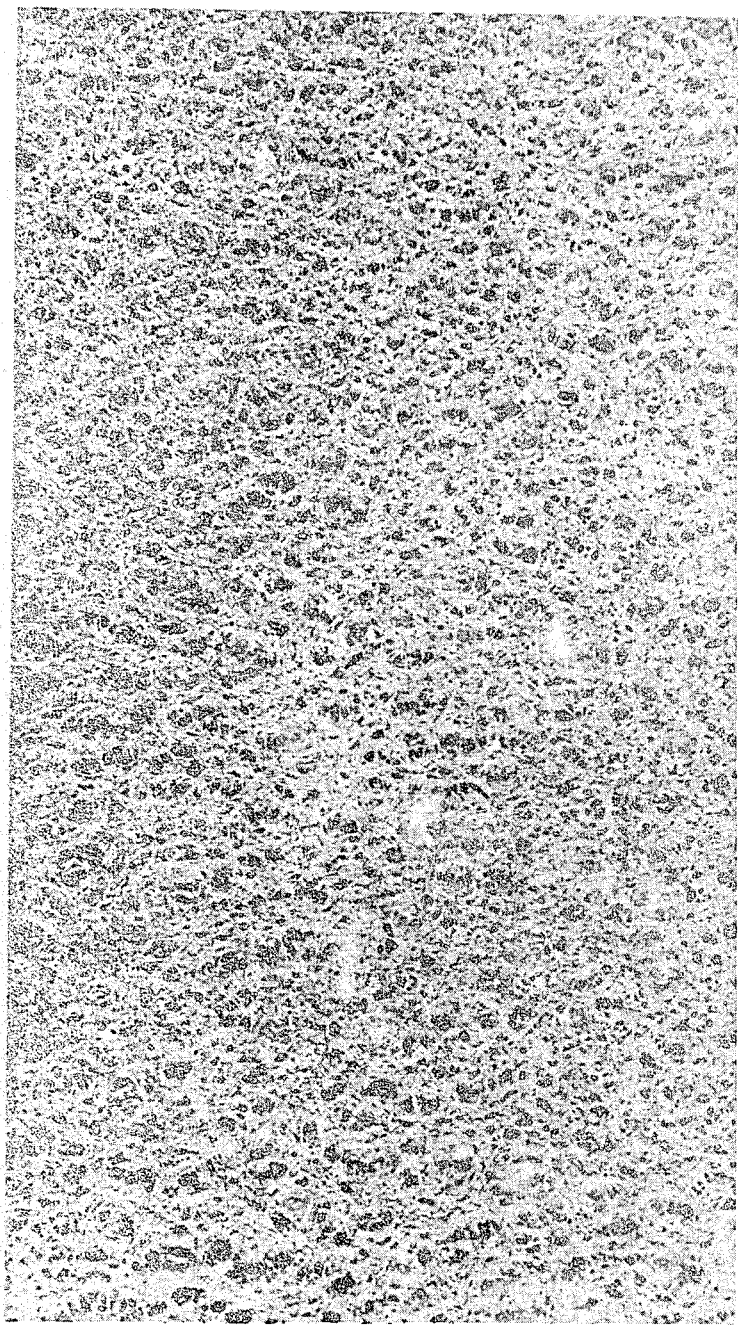

In the accompanying drawings, FIG. 1 is a flow-sheet showing the process of Example 1, and FIG. 2 is a photomicrograph of the product of Example 2 magnified about 3 times.

The following examples illustrate the invention.

EXAMPLE 1

The following are mixed in the weight ratio of 3:1:

(a) polyvinyl chloride powder plasticised with 30% of octyl phthalate, black in colour and passing through a screen having 160µ meshes; and (b) trilobal fibrils (15 denier; 1 mm. in length) of shrinkable non-plasticised polyvinyl chloride (sold under the trademark "Retractyl").

This mixture is sprinkled by means of a screen having 2 mm. meshes on to an aluminium plate measuring 230 x 210 x 3 mm. covered with a silicone resin and heated to 200–220° C. until a thickness of about 5 mm. is obtained. The powder fuses, the fibres shrink, and holes form in the sheet. After 20 seconds, the layer is heated in the oven to 260° C. for another 20 seconds, and then cooled with water. The sheet is finally separated from its support. A stiff rectangle 1.5 mm. in thickness is obtained whose visible face, riddled with holes 1 to 5 mm. in diameter, is a perfect imitation of lava. The reverse of the sheet reproduces the relief of the aluminium plate but has numerous perforations of 0.2 to 1 mm. diameter.

The process of this example is shown diagrammatically in FIG. 1.

EXAMPLE 2

Example 1 is repeated, but with non-pigmented powder and fibrils of a light ochre colour. A sheet which is 1.5 mm. in thickness is obtained which is riddled with holes and has the apearance of aged limestone rock. FIG. 2 is a photomicrograph of this sheet shown beside millimetre squares. The degree of magnification is about 3 times.

The sheets prepared in accordance with Examples 1 and 2 have many uses, for example:

(a) As decoration: The porous nature of the sheet permits it to be adhesively secured to many surfaces which are to be given, for example, a stone appearance. The sheet may be ornamented with designs, either before or after fusion.

(b) As sound insulation.

(c) For securing purposes: The outer face of the sheet has an unexpected roughness. Placed on a fibrous textile (e.g. cloth or flannel) or even on a vertical fabric, it attaches to it directly, but may be detached without any considerable tearing-out of fibres. It can, therefore, be used as a support for documents (e.g. at exhibitions or conferences) or for any other light articles which have to be temporarily fixed in a vertical plane. More particularly, it can be cut-out in various patterns, in the form of letters for example, enabling texts to be composed easily (e.g. on window panes, at exhibitions or as titles for cinematographic films). This roughness also makes it possible to engage foamed products with which it is brought into contact.

EXAMPLE 3

Example 1 is repeated but with blue powder and colourless, 5 denier, ground cylindrical fibre (maximum length 1.5 mm.). A sheet which is 1.5 mm. thick is obtained which is finely porous (0.1 to 1 mm. pores on the reverse side) and the visible face of which is heavily creviced, showing many fibrils.

EXAMPLE 4

The following are mixed in the weight ratio 3:1:

(a) polyvinyl chloride powder plasticised by 42% of octyl phthalate, non-pigmented, passing through a screen having meshes of 160µ; and
(b) shrinkable fibrils (15 denier; 1 mm. in length; trilobal; light ochre) consisting of non-plasticised polyvinyl chloride (trademark "Retractyl").

This mixture is deposited as described in Example 1 on an aluminium plate which is 1 mm. thick and heated to 300° C., until a 2 mm. layer is obtained. The mixture fuses on contact with the metal, but the outer portion of the pulverulent layer escapes the heating. After cooling the assembly, the sheet formed is brushed to eliminate the unsintered particles, and detached from the metal plate. A sheet is thus obtained whose reverse side is a cast of the plate and whose other side has a finely granular appearance which is pleasant to touch, resembling the flesh side of a sheet of leather. The sheet obtained is flexible and pervious, and may be used for glove-making, for the production of sachets of volatile materials (e.g. p-dichlorobenzene or perfumed blocks or powders), or to line the lower face of heavy, abrasive or slippery articles.

I claim:

1. Process for the production of a porous sheet, which comprises depositing on a support a layer of a mixture of thermoplastic powder selected from the class consisting of powders of polyvinyl chloride, a polyvinyl ester, polyethylene, polypropylene and polystyrene, and heat-shrinkable fibrils of a spinnable thermoplastic copolymer or polymer selected from the class consisting of polyvinyl chloride polyvinyl esters, polyethylene, polypropylene and polystyrene, the fusion point of the said fibrils being higher than the fusion point of the said powder, and heating the layer from the side in contact with the support until the powder in contact with the support is completely fused and the remainder of the powder has only softened, and the fibrils have shrunk but not fused, cooling the assembly to solidify the sheet, and detaching the porous sheet from the support.

2. Process according to claim 1 in which after the layer has been heated from the side in contact with the support, it is then heated from the side not in contact with the support to complete shrinkage of the fibrils and then cooled and detached from the support.

3. Process according to claim 1 in which the powder passes through a screen having 0.5 mm. meshes but is retained on a screen having meshes of 80µ.

4. Process according to claim 1 in which the powder is of plastised polyvinyl chloride.

5. Process according to claim 1 in which the fibrils are 0.5 to 20 mm. in length and of 5 to 2000 denier, and shrink at least 10% of their length on heating.

6. Process according to claim 1 in which the fibrils are of unplasticised polyvinyl chloride.

References Cited

UNITED STATES PATENTS

| | | | |
|---|---|---|---|
| 2,371,868 | 3/1945 | Berg et al. | 264—126 |
| 2,936,301 | 5/1960 | Thomas et al. | 264—127X |
| 3,027,601 | 4/1962 | Barry | 264—127X |
| 3,099,042 | 7/1963 | Rabl | 264—126 |
| 3,180,913 | 4/1965 | Veitch et al. | 264—shrink digest |
| 3,229,008 | 1/1966 | Harrington et al. | 264—122 |
| 3,368,013 | 2/1968 | Pisciotta et al. | 264—126X |

PHILIP E. ANDERSON, Primary Examiner

U.S. Cl. X.R.

260—2.5; 264—41, 126, 342